US006947870B2

(12) United States Patent
Zhu et al.

(10) Patent No.: US 6,947,870 B2
(45) Date of Patent: Sep. 20, 2005

(54) NEURAL NETWORK MODEL FOR ELECTRIC SUBMERSIBLE PUMP SYSTEM

(75) Inventors: Dehao Zhu, Claremore, OK (US); Alex Crossley, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 66 days.

(21) Appl. No.: 10/644,073

(22) Filed: Aug. 18, 2003

(65) Prior Publication Data

US 2005/0043921 A1 Feb. 24, 2005

(51) Int. Cl.[7] ................................................ G06F 19/00

(52) U.S. Cl. ................................ 702/181; 702/6; 702/9; 702/33; 702/34; 702/35; 702/81; 702/84

(58) Field of Search ................................ 706/151, 231, 706/251, 900–904, 912; 702/6, 9, 33–36, 81–84, 113–115, 122–123, 188; 700/28, 29, 104–109, 110, 175, 177; 340/679, 680; 703/9, 10; 166/250.01

(56) References Cited

U.S. PATENT DOCUMENTS

| | | | | |
|---|---|---|---|---|
| 5,225,352 A | * | 7/1993 | Zanetta et al. | 436/518 |
| 5,418,710 A | * | 5/1995 | Ono et al. | 700/29 |
| 5,479,571 A | * | 12/1995 | Parlos et al. | 706/25 |
| 5,704,012 A | * | 12/1997 | Bigus | 706/19 |
| 5,767,606 A | * | 6/1998 | Bresolin | 310/254 |
| 5,862,513 A | * | 1/1999 | Mezzatesta et al. | 702/9 |
| 5,919,267 A | * | 7/1999 | Urnes et al. | 714/26 |
| 6,012,015 A | | 1/2000 | Tubel | |
| 6,305,216 B1 | * | 10/2001 | Samaroo | 73/53.01 |
| 6,353,815 B1 | * | 3/2002 | Vilim et al. | 706/15 |
| 6,529,780 B1 | * | 3/2003 | Soergel et al. | 700/10 |
| 6,704,689 B1 | * | 3/2004 | Hogan et al. | 702/184 |

OTHER PUBLICATIONS

K. Yasuda, et al, "Aesthetic Design System of Structures Using Neural Network and Image Database,". Proceedings of the 3rd Int'l. Symposium on Uncertainty Modeling and Analysisi (ISUMA '95) 115–120.

* cited by examiner

*Primary Examiner*—Carol S. W. Tsai
(74) *Attorney, Agent, or Firm*—Duane Morris LLP

(57) ABSTRACT

An apparatus and method is disclosed for modeling an electric submersible pump using a neural network, data from a deterministic model, and, optionally, data obtained from a real world electric submersible pump. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

19 Claims, 3 Drawing Sheets

NEURAL NETWORK MODEL FOR ELECTRIC SUBMERSIBLE PUMP SYSTEM

FIELD OF INVENTION

The present invention relates to modeling behavior of a characteristic of real-world artificial lift technology and systems, more specifically to modeling the behavior of a characteristic of an oil and water artificial lift pump such as an electrical submersible pump (ESP) and its application.

BACKGROUND OF THE INVENTION

Prior to implementing a design, especially in a production mode, such as for machinery including motors or pumps used with artificial lift technology and systems, manufacturers often like to test assumptions and engineering decisions about that machine. For some machinery, a testing phase can become expensive and involve prototypes and project scheduling delays. Exhaustive testing, e.g. using multiple scenarios to investigate response of the machine to the scenario, can be prohibitively costly or time consuming or both.

Newer modeling techniques can often save time and cost, e.g. a model of a wind-tunnel session can often be less costly—and nearly or as accurate—as using an actual wind tunnel. Modeling of behavior, such as neural networks, can adapt to changes in supplied environmental variables and can further be refined using real world data, leading to decreased time to market and decreased time to test a new design. Such modeling has been used and/or suggested for such applications as replacement and/or augmentation of flow performance features in a wind tunnel and other flow modeling applications.

DETAILED DESCRIPTION OF A PREFERRED EMBODIMENT

Figure 1:
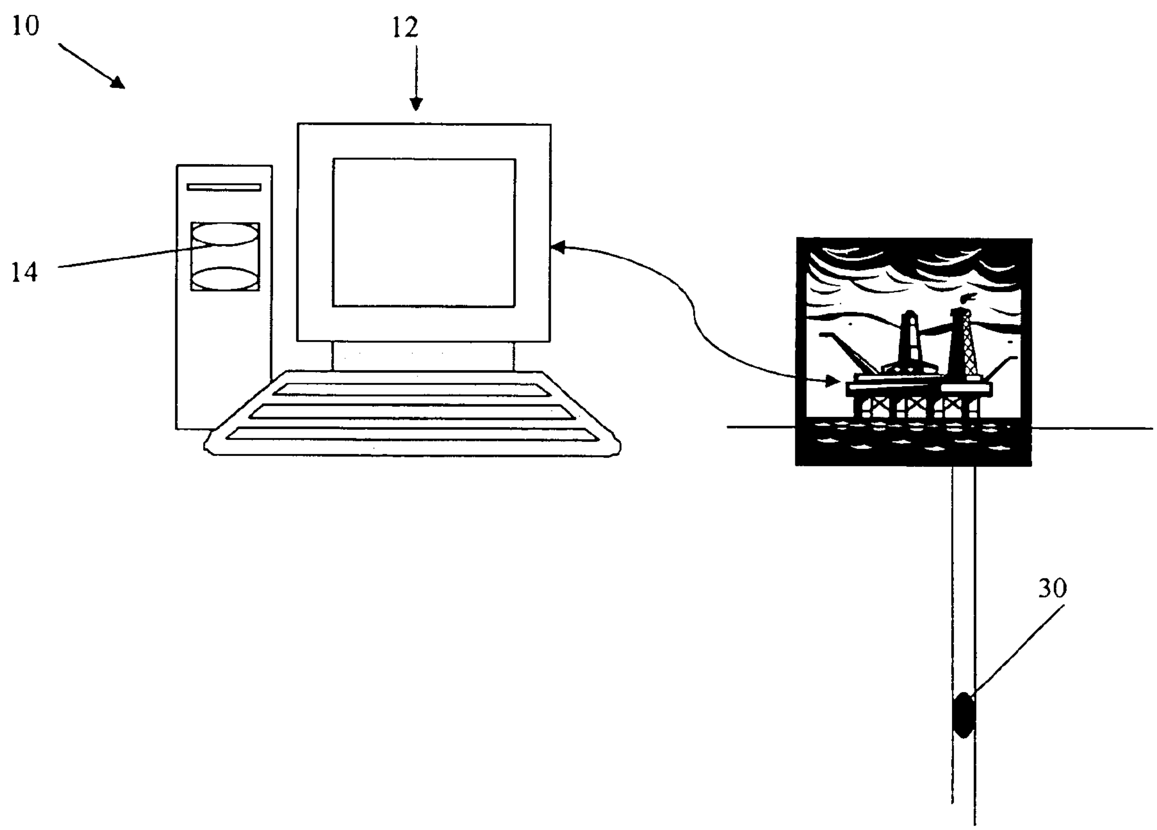
FIG. 1 is a schematic diagram of an exemplary system for modeling behavior of electric submersible pump application.

Referring now to FIG. 1, system 10 for modeling behavior of electric submersible pump application 1 comprises computer 12, data store 14 operatively in communication with computer 12, training data set 20 comprising data 22 stored in data store 14, source 30 of measured data 23 for electric submersible pump application 1 operatively in communication with computer 12; and neural network model 40 of electric submersible pump application 1.

Training data set 20 is of data related to one or more behaviors of electric submersible pump application 1. Training data set 20 comprises data representative of an electric submersible pump application. These data may relate to at least one predetermined characteristic of the electric submersible pump application and may further be arranged as a plurality of data sets generated from deterministic model 42 of electric submersible pump application 1 where deterministic model 42 may be obtained using at least one mathematical algorithm or at least one collection of mathematical algorithms based on engineering and physics principles that model one or more desired behaviors of electrical submersible pump application 1.

Data, such as data from source 30 of measured data 23, may be stored in data store 14 which may be a persistent data store, by way of example and not limitation including a magnetic medium, an optical medium, or an electronic medium.

Neural network model 40 is resident in computer 12. Neural network model is able to utilize training set 20 and measured data 23 to manipulate a model of submersible electrical pump application 1. In a preferred embodiment, neural network model 40 is an adaptable neural network, and, more typically, self-adaptable.

Neural network model 40 may comprise a weight matrix, a topology of neural network model 40, a training algorithm, an activation function, or the like, or a combination thereof.

Figure 2:
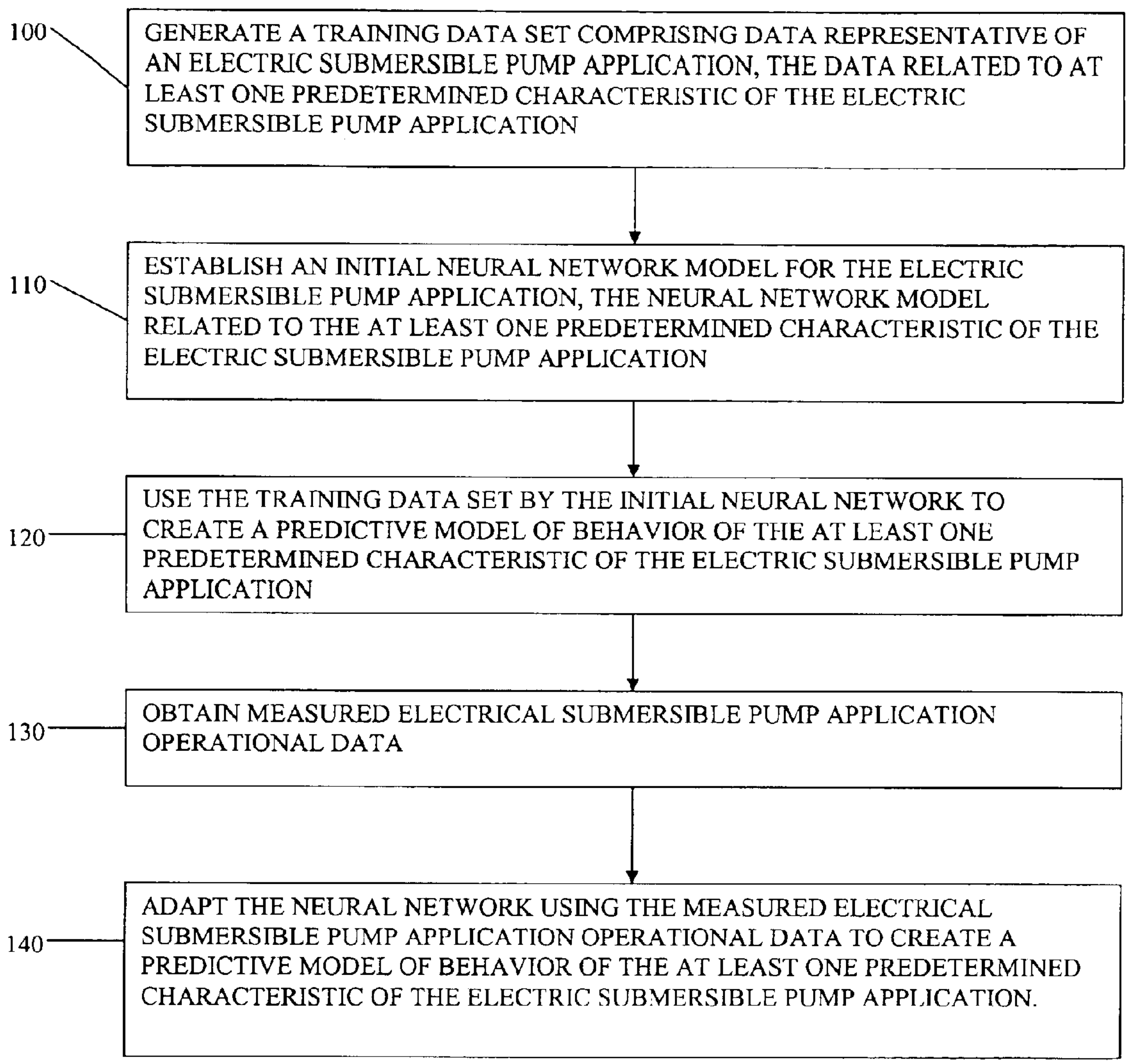
FIG. 2 is a flowchart of an embodiment of a method of modeling behavior of electric submersible pump application.

In the operation of an exemplary embodiment, referring now to FIG. 2, behavior of a characteristic of electric submersible pump application 1 may be predicted by generating, step 100, a training data set 20 comprising data representative of an electric submersible pump application 1, the data related to at least one predetermined characteristic of the electric submersible pump application 1; establishing, step 110, an initial neural network model 40 model for the electric submersible pump application 1, the neural network model 40 model related to the at least one predetermined characteristic of the electric submersible pump application 1; using, step 120, the training data set 20 by the initial neural network model 40 to create a predictive model of behavior of the at least one predetermined characteristic of the electric submersible pump application 1; obtaining, step 130, measured electrical submersible pump application operational data; and adapting, step 140, the neural network model 40 using the measured electrical submersible pump application operational data 23 to create a predictive model of behavior of the at least one predetermined characteristic of the electric submersible pump application 1.

In a preferred embodiment, training data set 20 is generated from deterministic model 42 of an electric submersible pump application 1. Training data set 20 may be obtained from data related to electric submersible pump application 1 as installed and used in a real world environment.

As will be understood by those of ordinary skill in the neural network arts, weight matrix 45 (not shown in the figures) may be adjusted using training algorithm 46 (not shown in the figures) that corresponds to neural network model 40 to predict actual behavior of electric submersible pump application 1 such as by minimizing a training error.

A predetermined output of neural network model 40 may be used to aid with data matching of historical measured data versus the output, fault diagnosis of electric submersible pump application 1, prediction of an operational characteristic of the electric submersible pump application 1, or the like, or a combination thereof.

Adaptation of neural network model 40 may be self-adaptation.

Figure 3:
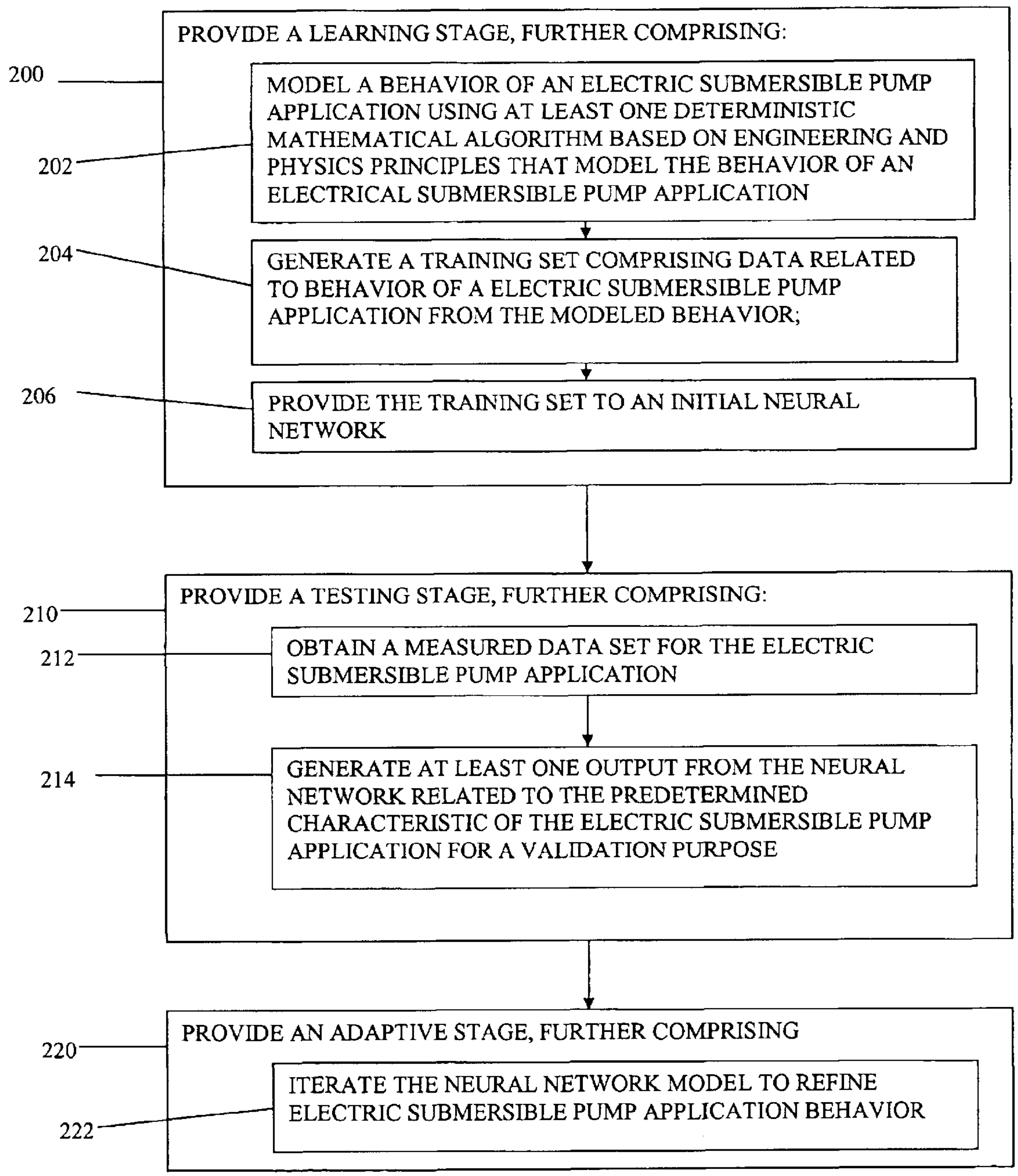
FIG. 3 is a flowchart of an embodiment of a further method of modeling behavior of electric submersible pump application.

In a further embodiment, referring now to FIG. 3, modeling may occur in stages, e.g. a learning stage may be provided, step 200, a testing stage may be provided, step 210, and an adaptive stage may be provided, step 220.

The learning stage may comprise modeling one or more desired behaviors of electric submersible pump application 1 such as by using one or more deterministic mathematical algorithms based on engineering and physics principles that model the desired behavior of electrical submersible pump application 1. Training data set 20, comprising of data related to the desired behavior of electric submersible pump application 1, may be generated from the modeled behavior. Once generated, training data set 20 may be provided to an initial neural network model 40 and neural network model 40 created to model one or more predetermined characteristics of electric submersible pump application 1.

The behavior model of electric submersible pump application 1 may be dependent on a predetermined number of inputs and outputs related to behavior of an actual electric submersible pump application 1. Such a behavior model may be useful for a prediction of a desired behavior of an actual electric submersible pump application 1, adaptation of a desired behavior of an actual electric submersible pump application 1, or the like, or a combination thereof.

During a testing stage, a measured data set 23 may be obtained for the electric submersible pump application 1. At least one output from neural network model 40 may be generated where the output relates to the one or more predetermined characteristics of the electric submersible pump application 1, e.g. for validation purposes. The output from neural network model 40 may comprise a simulated value for the predetermined characteristic of the electric submersible pump application 1, a calculated value for determined characteristic of the electric submersible pump application 1, or the like, or a combination thereof.

One or more predetermined outputs of the behavior model of the neural network model 40 may be compared to real world data for a desired behavior modeled by the neural network model 40. Further, during an adaptive stage, revisions of neural network model 40 may be iterated, e.g. by self adaptation of neural network model 40, to refine obtained predicted electric submersible pump application 1 behaviors, e.g. by the comparison process described above.

For example, once compared, further analysis may be undertaken, e.g. neural network model 40 may be adapted, either by neural network model 40 itself or by another process or by human intervention. In a further embodiment, neural network model 40 may be used to provide automated interpretation of real world data related to electric submersible pump application 1. By way of additional example, real world data related to actual behavior of electric submersible pump application 1 may be obtained, e.g. from source __and then provided to neural network model 40. These real world data may be used during iterations of neural network model 40 to improve predictions of behavior.

It will be understood that various changes in the details, materials, and arrangements of the parts which have been described and illustrated above in order to explain the nature of this invention may be made by those skilled in the art without departing from the principle and scope of the invention as recited in the appended claims.

We claim:

1. A method of predicting behavior of a characteristic of an electric submersible pump application, comprising:

a. generating a training data set comprising data representative of an electric submersible pump application, the data related to at least one predetermined characteristic of the electric submersible pump application;

b. establishing an initial neural network model for the electric submersible pump application, the neural network model related to the at least one predetermined characteristic of the electric submersible pump application;

c. using the training data set by the initial neural network to create a predictive model of behavior of the at least one predetermined characteristic of the electric submersible pump application;

d. obtaining measured electrical submersible pump application operational data; and e. adapting the neural network using the measured electrical submersible pump application operational data to create a predictive model of behavior of the at least one predetermined characteristic of the electric submersible pump application.

2. The method of claim 1, wherein:

a. the training data set is generated from a deterministic model of an electric submersible pump application.

3. The method of claim 2, wherein:

a. the deterministic model comprises mathematical algorithm based on engineering and physics principles that model the behavior of an electrical submersible pump application.

4. The method of claim 2, wherein:

a. the training data set comprises a plurality of data sets generated from the deterministic model of an electric submersible pump application obtained using at least one mathematical algorithm based on engineering and physics principles that model the behavior of an electrical submersible pump application.

5. The method of claim 2, wherein:

a. the data set is obtained from data related to the electric submersible pump application as installed and used in a real world environment.

6. The method of claim 1, wherein:

a. the neural network comprises at least one of (i) a weight matrix, (ii) a topology of neural network, (iii) a training algorithm, or (iv) an activation function.

7. The method of claim 6, further comprising:

a. adjusting the weight matrix using a training algorithm that corresponds to the neural network to predict actual behavior of the electric submersible pump application by minimizing a training error.

8. The method of claim 1, further comprising:

a. using a predetermined output of the neural network to aid with at least one of(i) data matching of historical measured data versus the output, (ii) fault diagnosis of the electric submersible pump application, or (iii) prediction of an operational characteristic of the electric submersible pump application.

9. The method of claim 1, wherein:

a. adaptation of the neural network is self-adaptation.

10. A method of predicting behavior of an electric submersible pump application, comprising:

a. providing a learning stage, further comprising:

i. modeling a behavior of an electric submersible pump application using at least one deterministic mathematical algorithm based on engineering and physics principles that model the behavior of an electrical submersible pump application;

ii. generating a training data set comprising data related to the behavior of a electric submersible pump application from the modeled behavior;

iii. providing the training data set to an initial neural network; and iv. creating a neural network model of a predetermined characteristic of the electric submersible pump application;

b. providing a testing stage, further comprising:
 i. obtaining a measured data set for the electric submersible pump application; and
 ii. generating at least one output from the neural network related to the predetermined characteristic of the electric submersible pump application for a validation purpose; and
c. providing an adaptive stage, further comprising:
 i. iterating the neural network model to refine a predicted electric submersible pump application behavior.

11. The method of claim 10, wherein:
a. the behavior model of the electric submersible pump application is dependent on a predetermined number of inputs and outputs related to behavior of an actual electric submersible pump application.

12. The method of claim 10, wherein:
a. the behavior model is useful for at least one of (i) a prediction of a desired behavior of an actual electric submersible pump application or (ii) adaptation of a desired behavior of an actual electric submersible pump application.

13. The method of claim 10, wherein:
a. the at least one output from the neural network related to a desired characteristic of the electric submersible pump application comprises at least one of (i) a simulated value for the predetermined characteristic of the electric submersible pump application or (ii) a calculated value for determined characteristic of the electric submersible pump application.

14. The method of claim 10, further comprising:
a. obtaining real world data related to actual behavior of the electric submersible pump application;
b. providing the real world data to the neural network; and
c. using the real world data during the iterations of the behavior model to create successive revisions of the neural network of the electric submersible pump application to refine the predicted electric submersible pump application behavior.

15. The method of claim 10, further comprising:
a. comparing a predetermined output of the behavior model of the neural network to a real world datum for a desired behavior modeled by the neural network.

16. The method of claim 10, further comprising:
a. using the neural network to provide automated interpretation of real world data related to the electric submersible pump application.

17. A system for modeling behavior of a electric submersible pump application, comprising:
a. a computer;
b. a data store operatively in communication with the computer;
c. a training data set generator adapted to generate a training data set comprising data stored in the data store, the training data set related to behavior of a electric submersible pump application;
d. a source of measured data for the electric submersible pump application operatively in communication with the computer, data from the source of measured data being storable in the data store;
e. a software modeler adapted to provide a learning stage, the learning stage comprising modeling a behavior of an electric submersible pump application using at least one deterministic mathematical algorithm based on engineering and physics principles that model the behavior of an electrical submersible pump application, providing the training data set to an initial neural network, and creating a neural network model of a predetermined characteristic of the electric submersible pump application; and
f. a neural network model of the electric submersible pump application, the neural network resident in the computer, the neural network able to utilize the training data set and measured data to manipulate a model of the submersible electrical pump application and generate at least one output related to the predetermined characteristic of the electric submersible pump application for a validation purpose.

18. The system of claim 17, wherein:
a. the neural network model is an adaptable neural network adapted to be interated to refine a predicted electric submersible pump application behavior.

19. The system of claim 18, wherein:
a. the adaptable neural network model is self-adaptable.

* * * * *